United States Patent
Ariglio et al.

[19]

[11] Patent Number: 5,826,772
[45] Date of Patent: Oct. 27, 1998

[54] METHOD AND APPARATUS FOR BREAKING BRITTLE MATERIALS

[75] Inventors: James A. Ariglio, Painted Post; Harry Menegus, Beaver Dams, both of N.Y.

[73] Assignee: Corning Incorporated, Corning, N.Y.

[21] Appl. No.: 810,480

[22] Filed: Mar. 3, 1997

Related U.S. Application Data

[63] Continuation of Ser. No. 521,616, Aug. 31, 1995, abandoned.

[51] Int. Cl.[6] ............................................. B26F 3/00
[52] U.S. Cl. ................... 225/2; 225/93.5; 225/97; 225/96.5
[58] Field of Search ................... 225/96.5, 93.5, 225/97, 94, 2; 219/121.67, 121.72, 121.76

[56] References Cited

U.S. PATENT DOCUMENTS

| | | | |
|---|---|---|---|
| 3,453,097 | 7/1969 | Häfner | 219/121.67 X |
| 3,543,979 | 12/1970 | Grove et al. | 225/2 |
| 3,610,871 | 10/1971 | Lumley | 219/121.76 |
| 3,695,497 | 10/1972 | Dear | 225/96.5 X |
| 3,790,362 | 2/1974 | Dahlberg et al. | 225/93.5 X |
| 3,795,502 | 3/1974 | De Torre | 225/93.5 X |
| 3,935,419 | 1/1976 | Lambert et al. | 219/121.67 |
| 4,467,168 | 8/1984 | Morgan et al. | 219/121.67 |
| 4,471,895 | 9/1984 | Lisec, Jr. | 225/96.5 X |
| 4,558,622 | 12/1985 | Tausheck | 225/96.5 X |
| 5,016,800 | 5/1991 | Sato et al. | 225/96.5 X |
| 5,084,604 | 1/1992 | Dekker et al. | 219/121.67 X |
| 5,138,131 | 8/1992 | Nishikawa et al. | 219/121.67 |
| 5,154,334 | 10/1992 | Dekker et al. | 225/93.5 X |
| 5,303,861 | 4/1994 | Allaire et al. | 225/96.5 X |
| 5,622,540 | 4/1997 | Stevens | 83/879 X |

FOREIGN PATENT DOCUMENTS

WO 93/20015  10/1993  WIPO.

*Primary Examiner*—Maurina T. Rachuba
*Attorney, Agent, or Firm*—Robert L. Carlson

[57] ABSTRACT

A system for breaking large sheets of brittle material such as glass into smaller sheets, in which at least one laser is moved across a sheet of brittle material having two major surfaces to form two vent cracks in the sheet, a first vent crack in a first path on one side of the sheet and a second vent crack in a second path on the other side of the sheet. The sheet is broken into smaller sheets by applying a bending moment under the vent cracks.

7 Claims, 2 Drawing Sheets

METHOD AND APPARATUS FOR BREAKING BRITTLE MATERIALS

This is a continuation of application Ser. No. 08/521,616, filed Aug. 31, 1995, now abandoned.

FIELD OF THE INVENTION

The present invention relates to a method for breaking brittle materials, such as glass sheets, more particularly a method for enhancing the use of laser scoring techniques to break brittle materials such as glass sheets.

BACKGROUND OF THE INVENTION

Lasers have been used heretofore for splitting brittle materials such as glass sheets. PCT Patent Publication Number WO 93/20015 describes utilizing a laser to propagate a so-called blind crack across a glass sheet to break the sheet into two smaller glass sheets. In one embodiment of this patent publication, a small nick or scribe is made at one side of the glass sheet, and this nick or scribe is then propagated in the form of a crack through the glass sheet using a laser. The sheet is then separated into the two smaller sheets by mechanical breaking along the line of the laser score. To effect such a method, the laser is contacted with the glass sheet in the area of the nick or scribe and the laser and glass sheet are moved relative to one another, so that the laser travels in the path desired to form the two smaller sheets. A stream of fluid coolant is preferably directed at a point on the heated surface of the glass just downstream from the laser, so that after the laser has heated the glass sheet, the glass sheet is quickly cooled. In this way, the heating of the glass sheet by the laser and the cooling of the glass sheet by the water coolant creates stresses in the glass sheet which cause the crack to propagate in the direction that the laser and coolant have traveled.

In making square glass sheets, the laser scoring process typically involves scoring the glass sheet along a first axis (the number one vent or score), and then following this scoring step with a second scoring step (resulting in the number two vent or score) at a right angle to the axis of the first scoring vent. Unfortunately, when using such laser scoring devices to make orthogonal cuts on a sheet of glass, a phenomenon occurs, at the intersection of the score lines, which detrimentally effects the accuracy of the first score line and the resultant edge of the glass. The phenomena appears to be a healing phenomenon wherein the first score line is actually closed or erased in the effected region. At the intersection of the number one and number two scores, the number one vent typically disappears completely or nearly completely, leaving the number one score axis with no vent at the intersections. The result is poor dimensional capability, wherein the resultant edge break is not satisfactorily straight and uniform.

It would therefore be desirable to design a process which results in more uniform edge breaks.

SUMMARY OF THE INVENTION

The present invention relates to a method for breaking brittle material such as glass sheets, wherein a first laser (and an optional coolant) is moved in a desired path across a glass sheet in order to lead a first vent crack in a first direction along the path of the laser. The same or a different laser is then similarly contacted with the other side of the sheet to form a vent crack in a second direction. The method is particularly suited for forming vent cracks whose paths intersect one another, such as is commonly the case when one glass sheet is cut into four sheets.

The temperature gradient produced by the lasers induces tensile stresses in the surface layers of the material and as these stresses exceed the tensile strength of the material, the material develops a partial crack which penetrates the material down to the regions which are under compression. As the laser is moved across the glass, the crack follows the laser. The depth, shape and direction of the crack are determined by the distribution of the stresses, which are in turn dependent on several factors, such as the power density, dimensions and shape of the beam spot; the rate of relative displacement of the beam spot and the material; the nature and quantity of the coolant supplied to the heated zone; and the thermophysical and mechanical properties of the material being cracked, as well as its thickness. In the present invention, the laser preferably has an intensity profile which is non-Gaussian. In one embodiment the intensity is bimodal, that is, it incorporates levels of more than one mode, for example, such as a laser which is operated in the $TEM_{01*}$ and $TEM_{10}$ modes. A stream or a jet of a suitable coolant is preferably directed at an area of the material in the wake of the advancing beam spot to bring about sharp localized cooling of the surface layer along the line of the cut.

The present invention is advantageous in that, because the intersecting vent cracks are formed on opposite sides of a glass sheet, there is no "healing" phenomenon observed, resulting in higher quality and more consistent break edges.

DETAILED DESCRIPTION OF THE INVENTION

Figure 1:
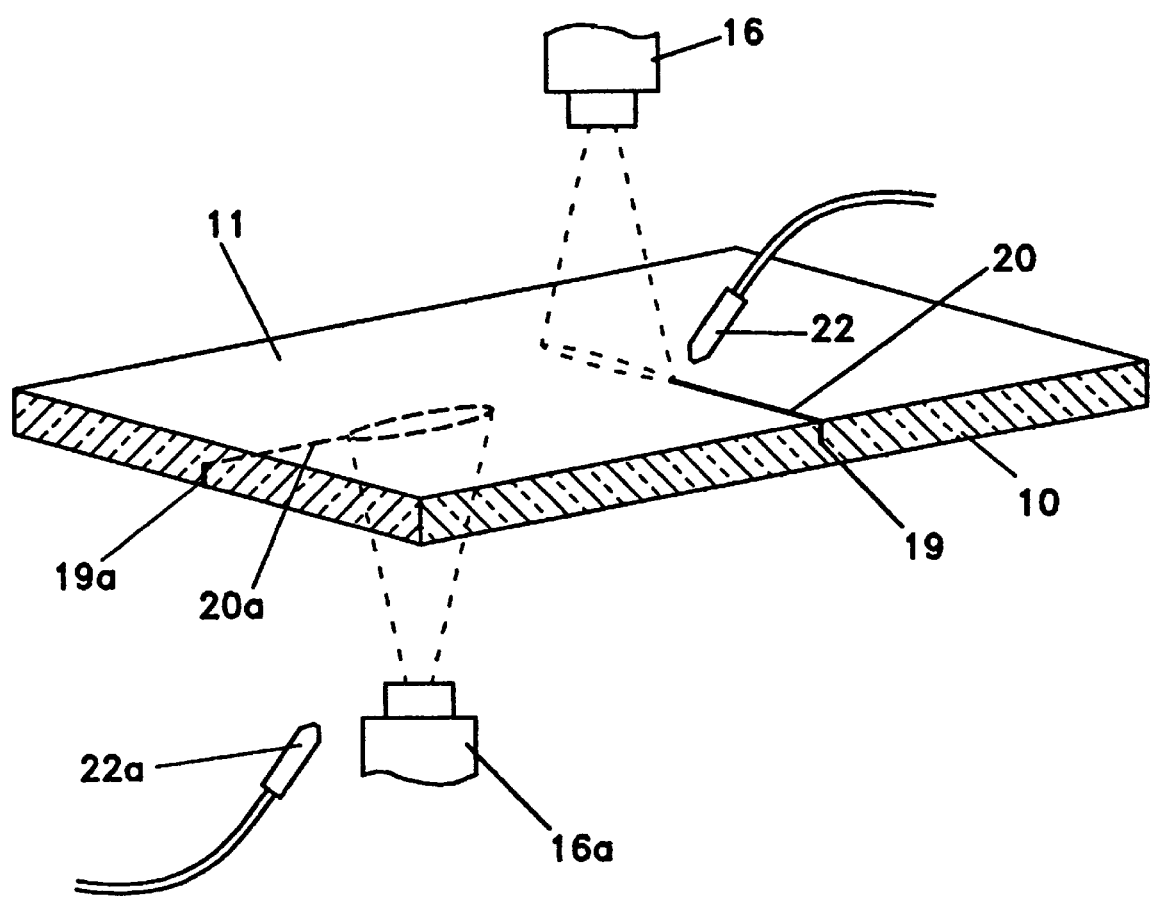
FIG. 1 illustrates a process for cutting glass in accordance with the present invention.

The present invention relates to a system for breaking glass sheets along a desired line of separation using a laser scoring separation technique. As illustrated in FIG. 1, in the glass breaking system of the present invention, glass sheet 10 has upper and lower major surfaces 11. Glass sheet 10 is first nicked or scored on one side along one edge of the glass sheet to form a crack initiation point 19 at one edge of the glass sheet 10. This crack initiation point 19 is then used to form crack 20, by movement of first laser 16 across glass sheet 10 in the path of the desired line of separation. The laser effectively heats the glass sheet in a localized area along the desired line of separation. The resultant thermal expansion of the glass sheet in the localized heated area creates stress which forces the crack to propagate along the path traveled by the laser.

Glass sheet 10 is then nicked or scored on one edge of the opposite side of the glass sheet to form a crack initiation point 19a at one edge of the glass sheet 10. This crack initiation point 19a is then used to form a crack 20a, which is orthogonal to and on the opposite side of crack 20, by movement of second laser 16a across glass sheet 10 in the path of the desired line of separation. In this way, the paths of vent crack 20 and vent crack 20a intersect one another, but the two vent cracks are on opposite sides of the glass sheet.

Cracks 20 and 20a preferably extend only partially into the depth of glass sheet 10. Final separation of the glass sheet into smaller sheets is then achieved by applying a bending moment under cracks 20 and 20a. Such bending can be accomplished using conventional bending apparatus (not shown) and techniques such as are used to break glass sheets in processes which utilize the more conventional mechanical surface scoring. Because cracks 20 and 20a are formed using the laser glass scoring technique, rather than a mechanical scoring technique, the formation of glass chips during the mechanical breaking step is greatly minimized compared to past techniques. Because cracks 20 and 20a are formed on opposite sides of a glass sheet, there is no "healing" phenomenon observed, resulting in higher quality and more consistent break edges.

Preferably, water coolant is applied through water jet 22 and 22a to enhance the stress distribution and thereby enhance crack propagation. By using the laser scoring technique rather than the more traditional methods which utilized mechanical scoring, many of the glass chips caused by mechanical scoring are avoided. By scoring the orthogonally intersecting score lines on opposite sides of the glass sheet, the healing phenomena described herein is completely avoided, resulting in better and more consistent edge break quality.

The laser beams used for the glass breaking operation should be able to heat the surface of the glass to be cut. Consequently, the laser radiation preferably is at a wavelength which can be absorbed by the glass. For this to occur, the radiation should preferably be in the infra-red range, with a wavelength in excess of 2 μm, such as the beam of a $CO_2$ laser, with its wavelength of 9–11 μm; or a CO laser with its wavelength of 5–6 μm, or an HF laser with its wavelength of 2.6–3.0 μm, or an erbium YAG laser, with its wavelength of about 2.9 μm. As the surface of the material is being heated, its maximum temperature should not exceed the softening point of the material. If the softening point of the material is exceeded, residual thermal stresses may set in after the glass has cooled, resulting in cracking.

Cracks 20 and 20a are formed in the glass down to the interface of the heated and cooled zones, that is in the area of the maximum thermal gradient. The depth, shape and direction of the crack are determined by the distribution of the thermoelastic stresses, which in turn are dependent primarily on the following several factors:

the power density, dimensions and shape of the beam spot;

the rate of relative displacement of the beam spot and the material;

the thermophysical properties, quality and conditions of supply of the coolant to the heated zone; and the thermophysical and mechanical properties of the material to be cracked, its thickness, and the state of its surface.

To optimize the cutting cycle for different materials, it is necessary to establish the proper relationship between the major parameters and variables of the cutting process. As explained in PCT International Publication Number WO 93/20015, the specification of which is hereby incorporated by reference, depending on the dimension of the beam spot 18 and its spacing from the area on which the coolant stream falls, the speed V of the relative displacement of beam 16 across the glass 10, and the depth d of crack 20, are related by the expression:

$$V = ka(b+l)/d, \text{ where:}$$

V is the rate of relative displacement of the beam spot and of the material;

k is a proportionality factor dependant on the thermophysical properties of the material and the beam power density;

a is the width of the beam spot;

b is the length of the beam spot;

l is the distance from the rear edge of the beam spot to the front edge of the cooled zone, and d is the depth of the blind crack 4.

In determining the maximum power density of the laser beam employed for cutting the material, the maximum temperature of the surface layer of the material should not exceed its softening point. Thus, a minimum power density value of about $0.3 \times 10^6$ W/m² is acceptable for the lower-melting grades of thick glass at low thermal splitting speeds. A larger power density value of, for example, $20 \times 10^6$ W/m² may be used to break high-melting quartz glass, conundum and other materials with either a high softening point or a high value of thermal conductivity.

Preferably, laser beams having components of the $TEM_{01}$, $TEM_{01*}$, $TEM_{10}$ mode, or combinations thereof, are used to deliver the laser energy to the glass surface. Such laser beams deliver the laser energy more uniformly than those having only a Gaussian power distribution. As a result, higher laser scoring speeds can be achieved using lower powers than if the laser had only a Gaussian power distribution. In addition, the operable window in which the laser scoring process is enlarged, enabling the use of a wider range of laser powers.

Because the temperature of the surface of the glass 10 is directly dependent on the time of its exposure to laser beam 16, the use of a beam of elliptical instead of circular cross-section extends the time of the heating of each point on the surface of the glass 10 along the cutting line for the same rate of relative displacement. Hence, with a set power density for laser beam 16, and with the same distance from the laser beam spot to the front edge of the coolant spot, which is essential for maintaining the required depth of heating of the glass 10, the greater the laser beam spot is extended in the displacement direction, the greater the achievable rate of relative displacement of the laser beam and material will be.

Although FIG. 1 shows two lasers (16 and 16a), the use of two lasers is not absolutely necessary. For example, a first laser score could be made on one side of glass sheet 10 using laser 16, after which glass sheet 10 could be flipped over to score the other side, again using laser 16.

Figure 2:
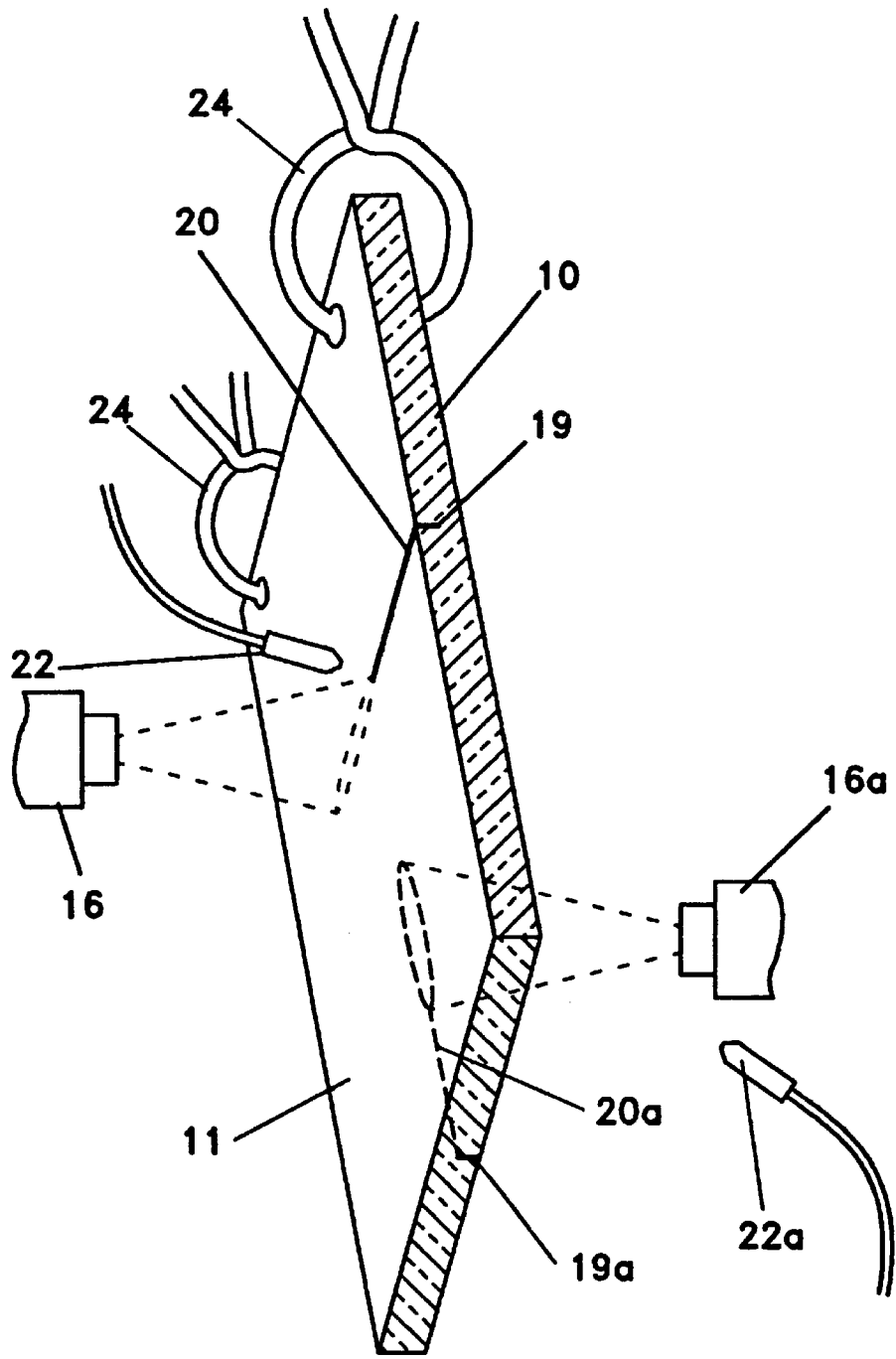
FIG. 2 illustrates an alternative process for cutting glass in accordance with the present invention.

In an alternative embodiment, illustrated in FIG. 2, glass sheet 10 is held in a vertical position by tongs 24, and lasers 16 and 16a are positioned on opposite sides of glass sheet 10. Operation of this embodiment follows that described above with respect to FIG. 1. Final breaking of the glass sheet can then be achieved either while the glass is held vertically, or by supporting the glass sheet horizontally. In either case, the glass is broken into smaller sheets by applying a bending moment underneath each of the score lines.

In the preferred embodiment of the invention, a system controller, such as a digital computer (not shown) is operatively connected to the system to control movement of the laser and/or the glass sheet, as well as other moving parts on the system. The system controller utilizes conventional machine control techniques to control movement of the various components of the system. Preferably, the system controller utilizes various production operating programs stored in its memory, each program designed to appropriately control movement of the laser or glass sheet (and other moving parts, if necessary) for a particular size glass sheet.

The following example, which is intended to be illustrative rather than limiting, demonstrates a method in accordance with the present invention.

EXAMPLE

Laser 16 was an axial flow dual beam $CO_2$ laser, Model SS/200/2 dual beam laser with 600 watts per tube, manufactured by PRC Corporation of North Frontage Road, Landing, N.J. 07850. The beam had a spot size (the diameter of the laser beam where it exits the laser) of about 12 mm, and was located about 2 meters from the glass surface. A pair of cylindrical lenses were located in the path of the laser, between the laser and the glass surface, to shape the laser spot. This resulted in a laser spot shape, where the laser impinged on the glass, which was elongated and somewhat elliptical, about 4–5 cm long and about 0.1 to 0.15 cm wide at its midpoint. The power distribution of the laser was a 60/40 blend of $TEM_{01*}$ and $TEM_{00}$ mode, which was achieved by employing a 20 meter radius concave optical coupler at the front of the laser. The power of the laser was varied between 160–200 watts and the speed of the laser as it moved across the glass sheet was about 500 mm/sec.

Glass sheet 10, which was an aluminosilicate glass sheet approximately 500 mm wide by 500 mm long by about 1.1 mm thick, was laser scored 9 times, three times on one side of the sheet in a first direction, and three times on the other side of the sheet in a second direction, the second direction being orthogonal to the direction of the first score lines. This type of scoring arrangement is designed to duplicate production operations for making LCD substrate glass, wherein the outermost score lines are meant to remove the outer edge portion of the glass sheets, and the middle score lines on each side of the sheet are meant to cooperatively separate the remainder of the glass into four usable pieces. The use of three score lines on each side of the glass sheet resulted in 9 intersection points wherein the path of the score line on one side of the sheet intersected the path of the score line on the other side of the sheet.

To accomplish this, the glass sheet 10 was manually scribed on each side of along the edge of the glass sheet to form three crack initiation points 19 at locations where a laser score line was desired. This created three crack initiation points 19 in the form of small score lines approximately 4–8 mm long and approximately 0.1 mm deep, at one edge on the top surface of the glass. It is not necessary that the crack be 4–8 mm, but rather any crack which the laser can propagate is sufficient to serve as a crack initiation point. Glass sheet 10 was positioned so that laser 16 contacted one of the crack initiation points 19, and the glass sheet 10 was moved so that the path of laser 16 followed a straight path across the glass sheet, forming score line 20, as illustrated in FIG. 1. This process was repeated for each of the three score lines 20 on the first side of the glass sheet.

Glass sheet 10 was then turned over to expose the opposite side of glass sheet 10. The sheet 10 was manually scribed along the edge of the glass sheet to form three other crack initiation points 19a, and the glass sheet 10 was again moved so that the path of laser 16 followed a straight path across the glass sheet, to form three score lines 20a. The three score lines 20a made on the second side of the sheet were orthogonal to and on the opposite side of the three score lines 20 formed on the first side of glass sheet 10, and intersected the path of each of these score lines 20 at a right angle.

A bending moment was then applied under score line 20 to separate glass sheet 10 into two sheets. These two sheets were then turned over and a bending moment was applied to these two sheets in the area of score line 20a, thereby breaking the two sheets into four sheets. This process was repeated one more than 100 glass sheets, thereby forming over 900 points wherein the path of a score line 20 intersected the path of a score line 20a located on the opposite side of the glass sheet. In all cases, there was no evidence of crack healing in the area of intersection, and the break edges were consistently of a very high quality.

Although the invention has been described in detail for the purpose of illustration, it is understood that such detail is solely for that purpose and variations can be made therein by those skilled in the art, without departing from the spirit and scope of the invention, which is defined by the following claims. For example, although the invention has mainly been discussed from the standpoint of glass breaking, the invention could also be used to score and break other brittle materials, such as, for example, ceramic or glass-ceramic materials.

We claim:

1. A method for breaking a sheet of brittle material comprising the steps of:

providing a monolithic sheet of brittle material selected from the group consisting of glass, ceramic, or glass-ceramic, said sheet having a first and second major surface;

moving at least one laser across said first and second major surfaces of the sheet to form a first vent crack in a first path on the first major surface of the sheet and a second vent crack in a second path on the second major surface of the sheet, said first path crossing said second path at an angle, each of said first and second vent cracks extending only partially into said sheet; and breaking the sheet along said first and second vent cracks to form four smaller sheets of said brittle material, whereby forming of the vent cracks on opposite sides prevents self-healing of either of said vent cracks.

2. The method of claim 1, wherein said moving step comprises moving said at least one laser to form said first and second vent cracks such that said first path is orthogonal to said second path.

3. The method of claim 1, wherein said moving step comprises moving a first laser to form said first vent crack, and moving a second laser to form said second vent crack.

4. The method of claim 1, wherein each of said first and second vent cracks extend entirely across the first and second major surfaces, respectively.

5. The method of claim 1, wherein said breaking step comprises applying a bending moment under said first and second vent cracks to complete said breaking of said sheet.

6. A method for breaking glass sheets comprising:

moving at least one laser across a monolithic glass sheet, having a first and a second major surface, to form a first set of generally parallel vent cracks in a first path on said first major surface and a second set of generally parallel vent cracks in a second path on said second major surface, said first path crossing said second path, said first and second sets of vent cracks extending only partially into said sheet; and breaking the sheet along the two sets of vent cracks.

7. The method of claim 6, wherein said breaking step comprises applying a bending moment under said first and second vent cracks.

* * * * *